United States Patent
Tateishi et al.

(10) Patent No.: US 6,787,057 B2
(45) Date of Patent: Sep. 7, 2004

(54) VISCOUS LIQUID VIBRATION DAMPING COMPOSITION

(75) Inventors: Mari Tateishi, Chiba Prefecture (JP); Shoji Akamatsu, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/846,834

(22) Filed: May 1, 2001

(65) Prior Publication Data

US 2003/0191216 A1 Oct. 9, 2003

Related U.S. Application Data

(63) Continuation-in-part of application No. 09/406,583, filed on Sep. 27, 1999.

(30) Foreign Application Priority Data

Sep. 30, 1998 (JP) ............................................. 10-278537

(51) Int. Cl.[7] ................................................. C09K 3/00
(52) U.S. Cl. .............................. 252/1; 252/364; 252/62
(58) Field of Search .............................. 252/1, 364, 62; 524/269; 181/207

(56) References Cited

U.S. PATENT DOCUMENTS

| 3,894,169 | A | * | 7/1975 | Miller | 181/207 |
|---|---|---|---|---|---|
| 4,374,950 | A | | 2/1983 | Shimizu | 524/765 |
| 4,416,790 | A | | 11/1983 | Schurmann et al. | 252/62 |
| 4,514,529 | A | | 4/1985 | Beers et al. | 523/200 |
| 4,678,828 | A | | 7/1987 | Nakamura et al. | 524/265 |
| 5,342,721 | A | | 8/1994 | Akamatsu | 430/108 |
| 5,550,185 | A | | 8/1996 | Inoue et al. | 524/847 |
| 5,661,203 | A | * | 8/1997 | Akamatsu et al. | 524/269 |
| 5,745,472 | A | | 4/1998 | Son | 369/263 |
| 5,840,220 | A | | 11/1998 | Akamatsu et al. | 264/15 |
| 5,856,396 | A | * | 1/1999 | Vipperman | 524/425 |
| 6,274,648 | B1 | | 8/2001 | Meguriya et al. | 523/218 |
| 6,347,411 | B1 | | 2/2002 | Darling | 2/272 |
| 6,605,231 | B2 | * | 8/2003 | Kobayashi et al. | 252/62 |

FOREIGN PATENT DOCUMENTS

| EP | 0 635 549 B1 | 7/1994 | C08L/83/04 |
|---|---|---|---|
| EP | 0651020 A2 * | 3/1995 | C08L/83/04 |
| EP | 0 990 816 A1 | 9/1999 | F16F/9/00 |
| JP | 62-113932 | 5/1987 | F16F/13/00 |
| JP | 63-308241 | 12/1988 | F16F/13/00 |
| JP | 63-308242 | 12/1988 | F16F/13/00 |
| JP | 09263525 | 10/1997 | A61K/7/46 |
| JP | 10-251517 | 9/1998 | C08L/83/04 |
| JP | 10281202 | 10/1998 | F16F/9/30 |
| JP | 11182624 | 7/1999 | F16F/15/04 |
| JP | 2000-08277 | 3/2000 | C08L/83/04 |
| WO | WO 97/16480 | * 9/1997 | C08K/3/26 |

* cited by examiner

*Primary Examiner*—Jiji Warden
*Assistant Examiner*—LaToya I. Cross
(74) *Attorney, Agent, or Firm*—Jim L. De Cesare

(57) ABSTRACT

A viscous liquid vibration damping composition containing (A) 30–95 weight percent of a viscous liquid, and (B) 5–70 weight percent of at least two solid powders having different average particle diameters, where the difference between the respective average particle diameters of the two solid powders is at least 10 $\mu$m. These viscous liquid vibration damping compositions are superior in vibration damping properties, and possess a stable vibration damping characteristic that is not significantly affected by temperature changes.

7 Claims, No Drawings

VISCOUS LIQUID VIBRATION DAMPING COMPOSITION

CROSS-REFERENCE TO RELATED APPLICATIONS

This application is a continuation-in-part of our prior copending application Ser. No. 09/406,583, filed Sep. 27, 1999.

FIELD OF THE INVENTION

The present invention relates to a viscous liquid vibration damping composition prepared by combining a viscous liquid and at least two solid powders. More particularly, this invention relates to a viscous liquid vibration damping composition possessing stable vibration damping characteristics which are not significantly affected by temperature changes.

BACKGROUND OF THE INVENTION

Vibration damping compositions containing viscous liquids and solid powders have been disclosed. For example, in Japanese Patent Publication No. 62113932 is disclosed a vibration damping composition containing water, liquid polymers such as diethylene glycol, glycerin, or polybutadiene, and clay mineral powders. In Japanese Patent Publication No. 63308241 is disclosed vibration damping compositions containing viscous liquids, such as silicone oil, and solid powders, such as silica powder, glass powder, and silicone resin powder. In Japanese Patent Publication No. 63308242 are disclosed vibration damping compositions containing viscous liquids, such as silicone oil, and powders of organic resins whose glass transition point is within the working temperature range, such as acrylic resins.

In addition, in Japanese Patent Publication No. 10251517 a vibration damping composition possessing excellent vibration characteristics even if the frequency of vibration changes was disclosed by the authors of the present invention. The vibration damping effects of these vibration damping compositions, however, varied depending on temperature changes, and they did not possess stable vibration damping characteristics.

SUMMARY OF THE INVENTION

The present invention relates to a viscous liquid vibration damping composition containing (A) 30–95 weight percent of a viscous liquid and (B) 5–70 weight percent of at least two solid powders having different average particle diameters, wherein the difference between the respective average particle diameters of the solid powders is at least 10 $\mu$m.

It is an object of the present invention to provide a viscous liquid vibration damping composition superior in vibration damping properties and possessing a stable vibration damping characteristic that is not significantly affected by temperature changes.

The term viscous liquid as used herein is intended to mean that compositions prepared according to this invention are viscous liquids, and range from viscous liquids having a kinematic viscosity of 100 mm$^2$/s at 25° C., to viscous liquids having a Williams Plasticity Number of 500 as determined according to Japanese Industrial Standard (JIS) Procedure K 6249 (ISO 7323).

DETAILED DESCRIPTION OF THE INVENTION

The present invention relates to a viscous liquid vibration damping composition containing (A) 30–95 weight percent of a viscous liquid and (B) 5–70 weight percent of at least two solid powders having different average particle diameters, wherein the difference between the respective average particle diameters of the solid powders is at least 10 $\mu$m.

In the viscous liquid vibration damping composition of this invention, Component (A), the viscous liquid, is a medium used for dispersing the solid powders, Component (B). The viscous liquid (A) is exemplified by mineral oil, vegetable oil, synthetic oil, and silicone oil. Preferably the viscous liquid is a silicone oil because of its high compressibility, weak dependence of changes in viscosity on temperature, and superior heat resistance. Organopolysiloxanes having a siloxane backbone are recommended as the silicone oil, with the organopolysiloxane preferably containing groups exemplified by alkyl groups such as methyl, ethyl and propyl, alkenyl groups such as vinyl and butenyl, aryl groups, such as phenyl and tolyl, halogenated alkyl groups such as 3,3,3-trifluoropropyl, and other substituted or unsubstituted monovalent hydrocarbon groups, and, additionally, a small amount of hydroxyl groups, methoxy groups, ethoxy groups, or other alkoxy groups as the groups bonded to the silicon atom in such siloxanes. Among them, in terms of the weak dependence of changes in viscosity on temperature and the excellent storage stability of the viscous liquid vibration damping composition of the present invention, alkyl groups are preferable, with the methyl group being particularly preferred. Also, the molecular structures of such silicone oils are exemplified by linear, partially branched linear, branched, and cyclic structures, with the linear structure being particularly preferred.

The kinematic viscosity of such silicone oils at 25° C. is, preferably, within the range of from 100 mm$^2$/s to 1,000,000 mm$^2$/s, with the range of from 500 mm$^2$/s to 500,000 mm$^2$/s being even more preferable. This is due to the fact that if the kinematic viscosity at 25° C. is less than 100 mm$^2$/s, maintaining the solid powders in a dispersed state tends to become impossible, and, on the other hand, if it exceeds 1,000,000 mm$^2$/s, the handling properties deteriorate, and it becomes more difficult to disperse the solid powders. Preferred silicone oils as Component (A) are exemplified by trimethylsiloxy-endblocked polydimethylsiloxanes and trimethylsiloxy-endblocked polydimethylsiloxane-polymethylphenylsiloxane copolymers.

The content of the viscous fluid, Component (A) in the viscous liquid vibration damping compositions of this invention, is typically from 30 weight percent to 95 weight percent, preferably from 30 weight percent to 91 weight percent, and, more preferably from 30 weight percent to 80 weight percent. This is due to the fact that if the amount of the added viscous fluid is not within this range, the vibration damping characteristics of the viscous liquid vibration damping compositions of this invention tends to deteriorate. If the weight percent of Component (A) is less than 30 weight percent, the resulting vibration damping composition will not be a viscous liquid.

The solid powder, Component (B), used in the viscous liquid vibration damping compositions of this invention, which is a component intended for imparting vibration damping properties to the viscous liquid vibration damping composition of the present invention, is a mixture of two or more solid powders with different average particle diameters. It is necessary that the difference in the particle diameters, based on the average particle diameter, of those two or more solid powders should be at least 10 $\mu$m, with 15 $\mu$m or more being preferable. The average particle diameters of the solid powders are usually within the range of from 1

μm to 200 μm, and, preferably, within the range of from 10 μm to 150 μm, with a mixture of (B1) a solid powder with an average particle diameter of 1 μm to 50 μm, and (B2) a solid powder with an average particle diameter of 20 μm to 200 μm, being particularly preferred as the solid powder of the present invention.

The solid powders are exemplified by inorganic powders such as silica powder, calcium carbonate powder, and glass powder, organic resin powders such as polyethylene resin powder and acrylic resin powder, and silicone resin powder. As for their shape, they can be spherical, oblate, and irregular in shape. It is preferable to combine powders of different materials, with a combination of a calcium carbonate powder with an average particle diameter of about 10–30 μm, and a glass powder with an average particle diameter of about 70–120 μm, being especially preferred.

The content of the two solid powders in the viscous liquid vibration damping composition of the present invention is within the range of from 5 weight percent to 70 weight percent, preferably, within the range of from 9 weight percent to 70 weight percent, and, more preferably, within the range of from 20 weight percent to 70 weight percent. This is due to the fact that if the amount of the added solid powders is not within this range, the vibration damping characteristic tends to deteriorate. In addition, the proportion, in which the above mentioned solid powder of component (B1) and solid powder of component (B2) are mixed, is preferably, such that component (B2) constitutes not more than 40 weight percent of component (B1).

The viscous liquid vibration damping composition of the present invention contains the above mentioned viscous liquid (A) and solid powders (B), but other optional components, such as clay, bentonite, silica micropowder, metallic soap, and other thickeners, anti-oxidants, rust preventives, flame resistance imparting agents, pigments, and dyes, may be added as well.

The viscous liquid vibration damping composition of the present invention is produced by homogeneously mixing the above mentioned viscous liquid (A) and the solid powders (B). Kneading techniques employing well-known kneading equipment, such as ball mills, vibrating mills, kneader-mixers, screw extruders, paddle mixers, ribbon mixers, Henschel mixers, jet mixers, Hobart mixers, roller mixers, and the like, can be used as the means for mixing the viscous liquid (A) and solid powders (B).

The resulting viscous liquid vibration damping composition of the present invention as described above is superior in vibration damping properties, and has the advantage of insignificant temperature dependency, which results in an excellent vibration damping characteristic even if the temperature fluctuates. For this reason, by placing it in containers made of elastic material to obtain shock-absorbing members, the viscous liquid vibration damping composition of the present invention can be utilized in shock-absorbing members used in electrical equipment, such as compact disc players, compact disc changers, minidisc players, and car navigation devices.

EXAMPLES

In the examples below, the kinematic viscosity is a value measured at 25° C.

Example 1

About 1000 g of a trimethylsiloxy-endblocked polydimethylsiloxane having a kinematic viscosity of 60,000 mm²/s, 1620 g of irregular-shaped calcium carbonate with an average particle diameter of 20 μm, and 360 g of spherical glass beads with an average particle diameter of 80–110 μm, were placed in a Hobart mixer and mixed at a low speed for one hour, with scraping carried out every 30 minutes. The vibration damping characteristics (tan δ) of the resulting viscous liquid vibration damping composition at –20° C., 25° C., and 60° C., were measured by the plate method, using an RDA-700 rheometric dynamic analyzer from RHEOMETRICS Inc. The measurement conditions were plate diameter: 20 mm, frequency: 10 Hz, strain: 20%, sample thickness: 1 mm. Subsequently, ratios to tan δ at 25° C. (tan δ/tan δ(25° C.)) were obtained from these results. The results are shown in Table 1.

Example 2

Except for adding spherical glass beads with an average particle diameter of 40–80 μm instead of spherical glass beads with an average particle diameter of 80–110 μm as in Example 1, a viscous liquid vibration damping composition was prepared in the same manner as Example 1. The tan δ of the resulting viscous liquid vibration damping composition at –20° C., 25° C., and 60° C., were measured in the same manner as in Example 1, and there was obtained ratios to tan δ at 25° C. from these results. The results are shown in Table 1.

Example 3

Except for adding a trimethylsiloxy-endblocked polydimethylsiloxane having a kinematic viscosity of 100,000 mm²/s, instead of a trimethylsiloxy-endblocked polydimethylsiloxane having a kinematic viscosity of 60,000 mm²/s as in Example 1, a viscous liquid vibration damping composition was prepared in the same manner as Example 1. The tan δ of the resulting viscous liquid vibration damping composition at –20° C., 25° C., and 60° C., were measured in the same manner as Example 1, and there was obtained ratios to tan δ at 25° C. from these results. The results are shown in Table 1.

Comparative Example 1

A viscous liquid vibration damping composition was prepared in the same manner as Example 1, except that the spherical glass beads used in Example 1 were not added. The tan δ of the resulting viscous liquid vibration damping composition at –20° C., 25° C., and 60° C., were measured in the same manner as Example 1, and there was obtained ratios to tan δ at 25° C. from these results. The results are shown in Table 1.

Comparative Example 2

A viscous liquid vibration damping composition was prepared in the same manner as Example 1, except that spherical glass beads with an average particle diameter of 15 μm were added, instead of spherical glass beads with an average particle diameter of 80–110 μm as in Example 1. The tan δ of the resulting viscous liquid vibration damping composition at –20° C., 25° C., and 60° C., were measured in the same manner as Example 1, and there was obtained ratios to tan δ at 25° C. from these results. The results are shown in Table 1.

TABLE 1

|  | Vibration Damping Characteristic (tan δ) at 25° C. | Vibration Damping Characteristic [tan δ/tan δ (25° C.)] | |
|---|---|---|---|
|  |  | −20° C. | 60° C. |
| Application Example 1 | 3.90 | 0.52 | 1.50 |
| Application Example 2 | 9.10 | 0.40 | 1.67 |
| Application Example 3 | 3.09 | 0.62 | 1.56 |
| Comparative Example 1 | 15.8 | 0.37 | 1.70 |
| Comparative Example 2 | 12.9 | 0.38 | 1.77 |

It can be seen from Table 1 that the viscous liquid vibration damping compositions of this invention possess superior vibration damping properties, and a stable vibration damping characteristic that is not significantly affected by temperature changes.

What is claimed is:

1. A viscous liquid vibration damping composition comprising (A) 30–95 weight percent of a viscous liquid, and (B) 5–70 weight percent of at least two solid powders having different average particle diameters, the difference between the respective average particle diameters of the solid powders being at least 10 µm, where one of the solid powders is calcium carbonate, and the other solid powder is an inorganic powder other than calcium carbonate, a polyethylene resin powder, an acrylic resin powder, or a silicone resin powder.

2. A viscous liquid vibration damping composition according to claim 1 wherein (A) is mineral oil, vegetable oil, a synthetic oil, or a silicone oil.

3. A viscous liquid vibration damping composition according to claim 2 wherein (A) is a silicone oil with a kinematic viscosity of 1100–1,000,000 mm$^2$/s at 25° C.

4. A viscous liquid vibration damping composition according to claim 1 wherein the difference between the respective average particle diameters of the solid powders is at least 15 µm.

5. A viscous liquid vibration damping composition according to claim 4 wherein the average particle diameters of the solid powders are 1–200 µm.

6. A viscous liquid vibration damping composition according to claim 5 wherein the average particle diameters of the solid powders are 10–150 µm.

7. A viscous liquid vibration damping composition according to claim 1 wherein the calcium carbonate powder has an average particle diameter of 10–30 µm, and the other solid powder is a glass powder with an average particle diameter of 70–120 µm.

* * * * *